United States Patent [19]

Yonovich et al.

[11] Patent Number: 4,540,070

[45] Date of Patent: Sep. 10, 1985

[54] VIBRATION DAMPENER FOR COIL TENSION WINDOW BALANCE SPRING

[75] Inventors: John R. Yonovich, Shortsville; William P. Newton, Rochester; Brian S. Dense, Macedon, all of N.Y.

[73] Assignee: Caldwell Manufacturing Co., Inc., Rochester, N.Y.

[21] Appl. No.: 632,244

[22] Filed: Jul. 19, 1984

[51] Int. Cl.³ .............................................. F16F 7/10
[52] U.S. Cl. ..................................... 188/380; 16/197; 16/DIG. 6; 16/DIG. 36; 248/568; 248/636; 267/141
[58] Field of Search ....................... 248/636, 568, 569; 267/141, 141.1, 141.2, 141.3, 141.5, 141.7; 188/380, 205 A; 16/DIG. 6, DIG. 36, 197, 198, 199, 200, 201; 49/445, 446, 181

[56] References Cited

U.S. PATENT DOCUMENTS 2,595,135  4/1952  Greenslade ........................ 248/569
2,942,872  6/1960  Muller ........................... 267/141.3 X
3,275,275  9/1966  Erhart et al. ..................... 267/141.2

FOREIGN PATENT DOCUMENTS 931827  3/1948  France ............................ 267/141.2

Primary Examiner—J. Franklin Foss
Assistant Examiner—David L. Talbott
Attorney, Agent, or Firm—Stonebraker, Shepard & Stephens

[57] ABSTRACT

Molded resin vibration dampener is mounted on coiled tension window balance springs arranged within spring covers. A resin wall of the vibration dampener, shaped for fitting around the tension spring, has a slot oriented longitudinally of the spring, and the wall is flexible enough to allow the slot to be spread open so that the body can be pressed onto a mid-region of the spring. Resilient fins extend obliquely outward from the body far enough to engage an interior surface of the spring cover and thereby hold the body and the spring spaced away from the spring cover to prevent rattling of the spring within the cover.

14 Claims, 2 Drawing Figures

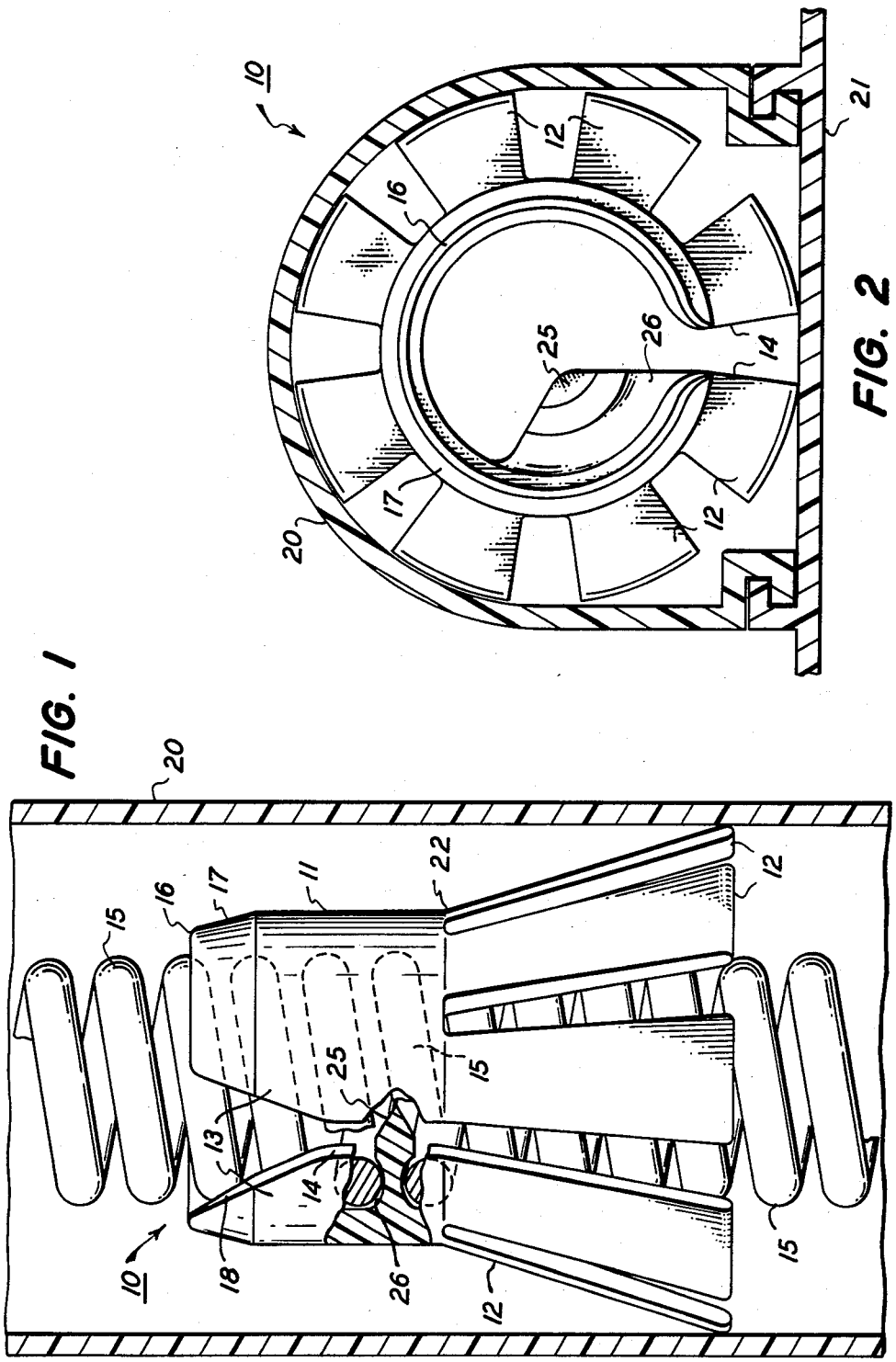

VIBRATION DAMPENER FOR COIL TENSION WINDOW BALANCE SPRING

BACKGROUND

Coiled tension window balance springs can rattle within their spring covers when a door slams or a truck passes by. House vibrations setting a number of window springs rattling can be quite annoying.

A proposed solution has been to flock fibrous material onto coiled balance springs to soften their exteriors and deaden the sound of their vibration. This has not worked well, and the problem remains largely unsolved.

We have devised a simple, low-cost, and effective way of eliminating sound from any vibration of coiled window balance springs. Our solution uses a simple part inexpensively molded of resin material and easily applied to coiled tension window balance springs as they are assembled. Our solution is also completely effective in eliminating vibrational noise from window balance springs and can be expected to perform this task reliably for the life of the window system.

SUMMARY OF THE INVENTION

We eliminate rattling of a coiled tension window balance spring within its spring cover by applying a vibration dampener that makes the spring stand off vibrationally clear of surrounding surfaces. The vibration dampener has a resin body with a wall shaped for fitting around the spring, and the wall has a slot oriented longitudinally of the spring. The wall is flexible enough to allow the slot to spread open so that the body can be pressed onto a mid-region of the spring. The body also has resilient fins extending obliquely outward far enough to flexibly engage an interior surface of the spring cover around the spring and thereby hold the body and the spring spaced away from the spring cover to prevent rattling of the spring when it vibrates within the cover.

DRAWINGS

FIG. 1 is a partially cut-away, fragmentary elevational view of a preferred embodiment of our vibration dampener applied to a coiled tension window balance spring within a spring cover; and FIG. 2 is a top view of the vibration dampener of FIG. 1, shown with the balance spring removed.

DETAILED DESCRIPTION

Our preferred vibration dampener 10, as shown in the drawings, includes a body 11 from which resilient fins 12 extend obliquely outward. Dampener 10 is molded of resin material forming body 11 with a resin wall 13 shaped to fit around coiled tension window balance spring 15. Wall 13 has a slot 14 oriented longitudinally of spring 15 when body 11 is mounted on spring 15 as illustrated.

In mounted position, resilient fins 12 extend far enough outward from body 11 to flexibly engage the interior surface of jamb liner 21 and a spring cover 20 surrounding spring 15. Flexible fins 12 then hold body 11 and spring 15 in a stand off position spaced from spring cover 20 and jamb liner 21 to keep spring 15 from rattling against a fixed surface when it vibrates. Fins 12 are preferably radially spaced around body 11, as best shown in FIG. 2, and resemble the fins of a badminton shuttle cock.

House vibrations inevitably set balance spring 15 to vibrating, but dampener 10, holding spring 15 in a stand off position from the fixed surfaces of spring cover 20 and jamb liner 21, prevents the vibrating spring from rattling against any fixed surface. Since fins 12 are thin and resilient, they absorb vibrational energy from spring 15 and maintain a constant and soundless contact with the inside surface of spring cover 20 and jamb liner 21.

Dampener 10 is inexpensively molded of a resin material such as polyethylene so that it can be economically made in large quantities. One dampener 10 per spring is ordinarily adequate to prevent rattling so that four dampeners 10 can quiet a double-hung window system having four balance springs. Our vibration dampener can also be applied to different jamb liner and spring cover constructions, so that it can stop rattling of coiled tension balance springs in a variety of window systems.

Slot 14 in resin wall 13 has a flair 18 toward the nose end 16 of body 11 opposite the fin end 22 of body 11. Nose end 16 also has a taper 17. The end flair 18 of slot 14 allows the nose end 16 of body 11 to be pressed foremost onto spring 15 in a movement that flexes wall 13 to spread open slot 14 as body 11 is pressed onto spring 15. As resin wall 13 snaps onto and partially encircles spring 15, it springs back toward a normal shape reducing the spread of slot 14 and leaving body 11 holding a position on a mid-region of spring 15.

Dampener 10 then moves up and down within spring cover 20 as a sash attached to spring 15 is raised and lowered. Dampener 10 is preferably mounted on a longitudinal mid-region of spring 15 that confines the motion of dampener 10 to a region within spring cover 20. However, if dampener 10 is mounted too low on spring 15, it can be either stopped by the lower end of spring cover 20 and hold a position there while spring 15 moves further downward, or it can ride out from under the lower end of spring cover 20 with spring cover 15. The outward taper 17 at nose 16 and the oblique outward angle of fins 12 facilitate reentry of dampener 10 into the lower end of spring cover 20.

Resin wall 13 can be formed with an internal projection 25 shaped to extend between adjacent turns of spring 15 to hold body 11 in a fixed longitudinal position relative to the spring coils engaged by projection 25. This makes dampener 10 ride up and down with spring 15 without any change from its installed position relative to spring 15. Projection 25 preferably has a narrow neck 26 forming a detent with the turns of spring 15, once body 11 is snapped onto spring 15, forcing the inner end of projection 25 between spring coils. Projection 25 is also preferably arranged adjacent slot 14, as best shown in FIG. 2, so as to slide in between spring coils as dampener 10 is pressed onto spring 15.

If projection 25 is used to interlock body 11 with spring 15, then mounting body 11 too low on spring 15 can cause dampener 10 to move below the lower end of spring cover 20 when a sash is fully lowered. This eliminates the dampening effect of dampener 10, so it is better to mount body 11 adequately high on spring 15 so that it stays within spring cover 20 throughout its range of movement. It is also possible to mount more than one dampener 10 on each spring 15, and this would be desirable for exceptionally long balance springs.

Dampeners 10 are preferably pressed onto longitudinal mid-regions of spring 15 as window balance systems are assembled at the factory. A guide can show the assemblers the optimum location for mounting bodies 11 relative to springs 15. Once assembled, dampeners 10 can hold springs 15 away from spring covers 20 and jamb liners 21, preventing spring rattle, for the life of the window system.

We claim:

1. A vibration dampener for a coiled tension window balance spring within a spring cover, said vibration dampener comprising:
   a. a resin body having a wall shaped for fitting around said coiled tension spring;
   b. said wall having a slot oriented longitudinally of said spring when said body is mounted on said spring;
   c. said wall being flexible enough to allow said slot to spread open so that said body can be pressed onto a mid region of said spring;
   d. resilient fins extending obliquely outward from said body; and
   e. when said body is mounted on said spring, said fins extending far enough from said body to flexibly engage an interior surface of said spring cover and thereby hold said body and said spring spaced away from said interior surface of said spring cover to prevent rattling of said spring within said cover.

2. The vibration dampener of claim 1 wherein said fins extend outward from a fin end of said body, and said slot has a flare at a nose end of said body opposite said fin end of said body, said flare allowing said nose end of said body to be pressed foremost onto said spring for flexing said wall to spread open said slot as said body is pressed onto said spring.

3. The vibration dampener of claim 1 wherein said body has an internal projection oriented radially inward to extend between turns of said spring and hold said body against longitudinal movement along said spring.

4. The vibration dampener of claim 3 wherein said projection is shaped for detenting between said turns of said spring.

5. The vibration dampener of claim 3 wherein said projection is arranged adjacent said slot to slide in between coils of said spring as said body is pressed onto said spring.

6. The vibration dampener of claim 1 wherein said fins taper to become thinner with greater distance outward from said body.

7. The vibration dampener of claim 1 wherein said body wall is generally cylindrical.

8. The vibration dampener of claim 7 wherein said fins extend outward from a fin end of said body, and said slot has a flare at a nose end of said body opposite said fin end of said body, said flare allowing said nose end of said body to be pressed foremost onto said spring for flexing said wall to spread open said slot as said body is pressed onto said spring.

9. The vibration dampener of claim 8 wherein said fins taper to become thinner with greater distance outward from said body.

10. The vibration dampener of claim 8 wherein said body has an internal projection oriented radially inward to extend between turns of said spring and hold said body against longitudinal movement along said spring.

11. The vibration dampener of claim 10 wherein said projection is shaped for detenting between said turns of said spring.

12. The vibration dampener of claim 10 wherein said projection is arranged adjacent said slot to slide in between coils of said spring as said body is pressed onto said spring.

13. The vibration dampener of claim 11 wherein said projection is shaped for detenting between said turns of said spring.

14. The vibration dampener of claim 13 wherein said fins taper to become thinner with greater distance outward from said body.

* * * * *